2 Sheets--Sheet 1.

C. STONE.
Transplanters.

No.152,255.

Patented June 23, 1874.

Witnesses.
E. H. Bates.
Phil C. Masi.

Inventor.
Columbus Stone
Chipman and Fosmeesler
Attys

2 Sheets--Sheet 2.
C. STONE.
Transplanters.
No.152,255. Patented June 23, 1874.
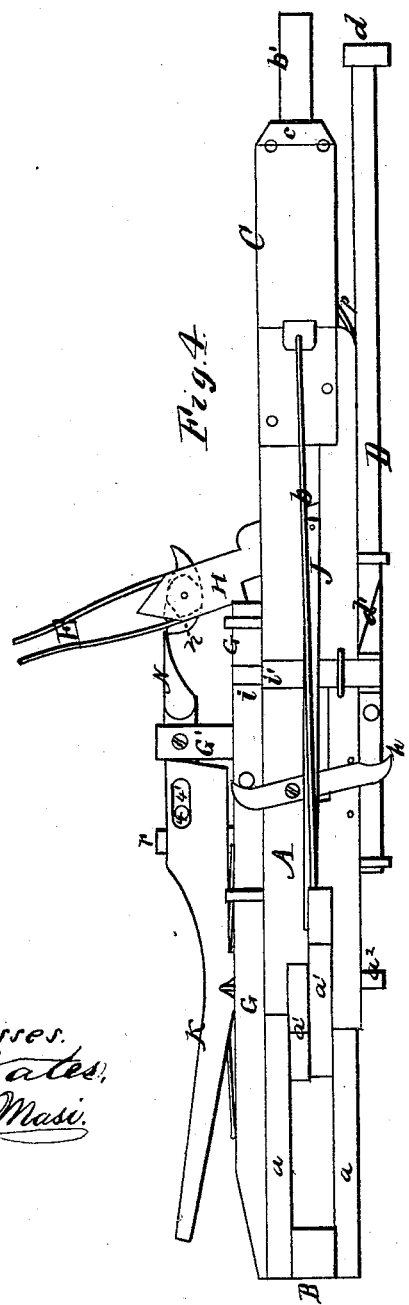
Witnesses.
E. H. Bates
Phil C. Masi
Inventor.
Columbus Stone
Chipman & Fosmer & Co
Attys
AM. PHOTO-LITHOGRAPHIC Co. N.Y. (OSBORNE'S PROCESS)

UNITED STATES PATENT OFFICE.

COLUMBUS STONE, OF GRIDER, KENTUCKY.

IMPROVEMENT IN TRANSPLANTERS.

Specification forming part of Letters Patent No. 152,255, dated June 23, 1874; application filed September 20, 1873.

*To all whom it may concern:*

Be it known that I, COLUMBUS STONE, of Grider, in the county of Cumberland and State of Kentucky, have invented a new and valuable Improvement in Devices for Setting Out Plants; and I do hereby declare that the following is a full, clear, and exact description of the construction and operation of the same, reference being had to the annexed drawings making a part of this specification, and to the letters and figures of reference marked thereon.

Figure 1:
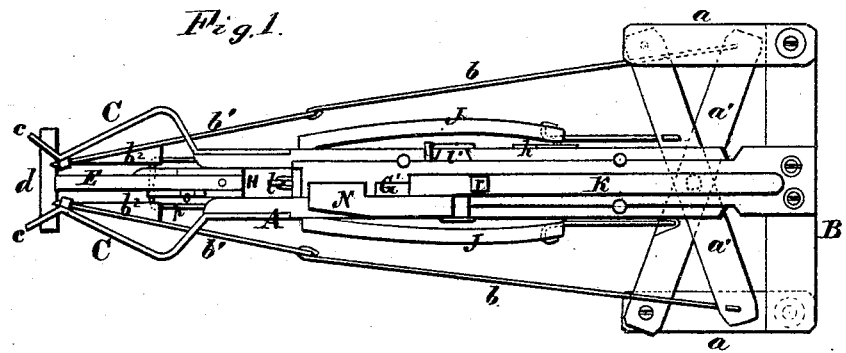
Figure 2:
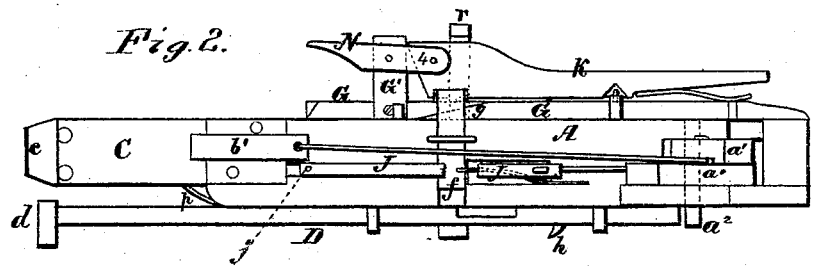
Figure 3:
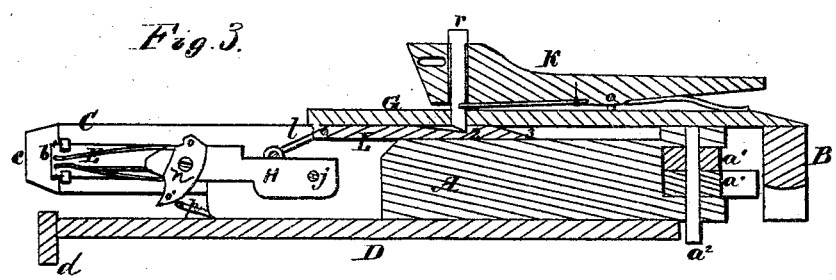

Figure 1 of the drawings is a representation of a front view of my plant-setter. Fig. 2 is a side view of same. Fig. 3 is a central longitudinal section of same. Fig. 4 is a view of the side opposite to Fig. 2. Figs. 5 and 6 are details of same.

This invention relates to certain novel improvements on hand devices for setting out plants without requiring a person to stoop.

In carrying out my invention I employ certain mechanical devices for operating a perforator, which makes the openings in the ground to receive the plants, and for operating gripers which take the plants from the hand of the operator and deposit their roots into the ground, and also for pressing the loose earth about the plants, as will be hereinafter explained.

In the annexed drawings, A represents the slotted stock of the plant-setter, to the upper part of which a cross-handle, B, is connected by means of pivoted arms $a$ $a$, and two crossed levers $a^1$ $a^1$, which latter are pivoted to the stock by a pin, $a^2$. The free ends of the levers $a^1$ $a^1$ are connected by rods $b$ $b$ to the upper ends of inclined perforators $b^1$ $b^1$, which are guided in their up-and-down movements by passing through the swelled and converging ends of two coverers, C C. The lower portions of the perforators $b^1$ $b^1$ have flanges $b^2$ $b^2$ formed on their edges, which, when they are brought together, as shown in Fig. 4, operate as a guard to the root of the plant, and keep it in proper position until it is inserted fully into its hole in the earth. The coverers, which press the earth closely about the roots of the plants, are secured to the lower ends of the stock A, and their lower ends $c$ $c$ are turned outward and downward for such purpose. On one side of the stock A is applied, by means of guides, a slide, D, having a limited movement longitudinally, and carrying on its lower end a foot-piece, $d$, the object of which is to give a purchase on the ground during the act of depressing the perforators $b^1$ $b^1$ and gripers E. This foot-slide D has an oblong recess cut into one edge, into which a spring dovetail latch, $f$, on the stock A, is received, which allows the perforators to be forced far enough into the soil, when the latch is moved out of the way by a beveled nose, $g$, on a slide, G, and the coverers allowed to be brought into action. When the coverers are fully depressed the foot-slide is stopped by a stud on it coming in contact with a stop-lever, $h$. The slide G works up and down on the front side of the stock A, and its upper end is secured rigidly to the cross-handle B. On one edge of it, near its lower end, is a notch, $i$, into which is received a sliding spring-latch, $i^1$, which locks the slide G until the perforators $b^1$ $b^1$ have made the hole in the soil ready to receive the plant from the gripers E, at which moment the slide G will be released from its latch $i^1$ by the action of a beveled nose, $d^1$, on slide D, and may be depressed. H represents the griper carrying-arm, which is pivoted at $j$ to the lower ends of bowed connecting-rods J J that play through oblong slots made through the sides of stock A. The upper ends of the rods J J are connected, respectively, to the vibrating levers $a^1$ $a^1$. The arm H is also connected to a slide, L, shown in the sectional view, Fig. 3, by means of a link, $l$. The slide L is notched at 2 and beveled at 3, and it works endwise in a groove formed in the stock A. K designates a thumb-lever, through which, and also through the slide G, plays a spring-latch, $r$, the beveled nose of which engages in the notch 2 in the slide L, and connects this slide with the slide G, so that they will both move together. N represents a tripping-finger, which is pivoted to a post, G', on slide G, and connected to the lower end of the thumb-lever K by means of a pin, 4, working in a slot, 4'. The object of the finger N is to allow the operator to shut the ends of the spring-gripers E after he has introduced a plant between them, and to this end a cam, $n$, shown in Fig. 5, is pivoted to the arm H, between the gripers E, and constructed with a notched extension, $o$, and a pointed toe, $o'$. The finger N is intended to actuate the cam $n$ by pressing on its notched extension $o$ and shutting the gripers, and the pointed extension $o'$ of this cam is intended to hook against a loop, $p$, at the lower end of the stock A, and open the gripers at the proper time for delivering a plant into the hole in the soil.

The operation is as follows: A full-sized plant-setter herein described is a little longer than an ordinary walking-cane. It is carried in the right hand, and the gripers E are fed by the left hand, a basket being belted to the person planting, in which the plants are carried. When the setter is lifted from the ground the two parts $b^1 b^1$ composing the perforator will be brought together, and the griper-arm will rise to a position at right angles to the stock A, and be locked by the two latches $f$ $i'$. The gripers E being open, the operator introduces a plant between them, and at the same time presses on the spring thumb-lever K, which closes the gripers on the plant and allows them to fall between the perforators $b^1 b^1$. When these perforators enter the soil a proper distance the foot-piece $d$ comes in contact with the soil, which releases the perforators and allows them to rise and recede from each other as they rise. At the same time the gripers are depressed and caused to deliver the plant into the hole made for it. By still continuing the pressure on the handle B the coverers C will complete the work by pressing the loose earth about the roots of the plant. Upon again raising the setter from the ground the perforators will be brought together and the spring-latch $r$ will engage with the slide L and raise the griper-arm to the horizontal position before named.

What I claim as my invention, and desire to secure by Letters Patent, is—

1. Converging sliding perforators $b^1 b^1$, combined with plant-gripers E on a vertically-vibrating arm, H, operated substantially as described.

2. The griper-arm H, pivoted to rods J J, which are connected to the vibrating crossed levers $a^1 a^1$ of handle B, combined as and for the purposes described.

3. The cam $n$ between gripers E and its extensions $o$ $o'$, combined with the finger N, thumb-lever K, and a loop, $p$, as and for the purposes described.

4. The notched slide L, connected by a link, $l$, to the griper-lever H, in combination with the slide G on stock A, and with the spring-latch $r$ through thumb-lever K, as and for the purposes described.

5. The crossed levers $a^1 a^1$, pivoted to stock A and connected to the handle B by arms $a$ $a$, and also connected by rods to the perforations $b^1 b^1$ and to the griper-carrying arm H, all combined as and for the purposes described.

6. The foot $d$, applied on a slide, D, in combination with latching and releasing devices $f$ $g$ $i$ $i'$, slides G L, griper-carrying arm H, perforations $b^1 b^1$, and coverers C C, substantially as specified.

7. The combination of a stock, A, perforations $b^1 b^1$, sliding foot $d$, plant-gripers E, and coverers C C, substantially as and for the purposes described.

In testimony that I claim the above I have hereunto subscribed my name in the presence of two witnesses.

COLUMBUS STONE.

Witnesses:
SAML. K. BAKER,
G. P. HERRIFORD.